Oct. 12, 1926.

A. H. LEIPERT 1,602,912

UNIVERSAL JOINT

Filed March 15, 1923

Inventor
August H. Leipert
By his Attorneys

Patented Oct. 12, 1926.

1,602,912

UNITED STATES PATENT OFFICE.

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE.

UNIVERSAL JOINT.

Application filed March 15, 1923. Serial No. 625,197.

In Letters Patent of the United States No. 1,414,411 dated May 2, 1922, there is shown and claimed broadly a universal joint in which the turning effort from one shaft to another is transmitted through cords which extend from one shaft to another along straight lines, which cords are so connected and related as to afford capacity for universal movement. In the particular embodiment shown in said patent the transmitting cords are carried in a yielding body which itself may be coupled to the shafts. The cords in said construction are placed under tension when transmitting driving forces. By the present invention it is proposed to employ the same principle but different means. Cords having some degree of elasticity are employed and these cords are connected to the driving and driven members under tension. Driving forces are transmitted by them along straight lines in accordance with the principle described in said patent. The improved cords may or may not be disposed within a separate carrier although the illustrated embodiment contemplates that they shall be exposed and when wound into place, put under tension and then secured for the purpose of performing their function.

The invention will be described with reference to the embodiment shown in the accompanying drawings, wherein.

Figure 1:
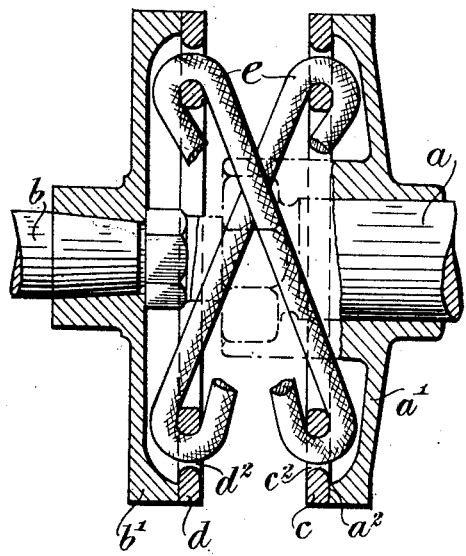
Figure 1 is a view in section through coupling members keyed to driving and driven shafts and affording anchorage for the cords of the improved joint, the view being taken on the plane indicated by the line 1—1 of Figure 2 and looking in the direction of the arrows.
Figure 2:
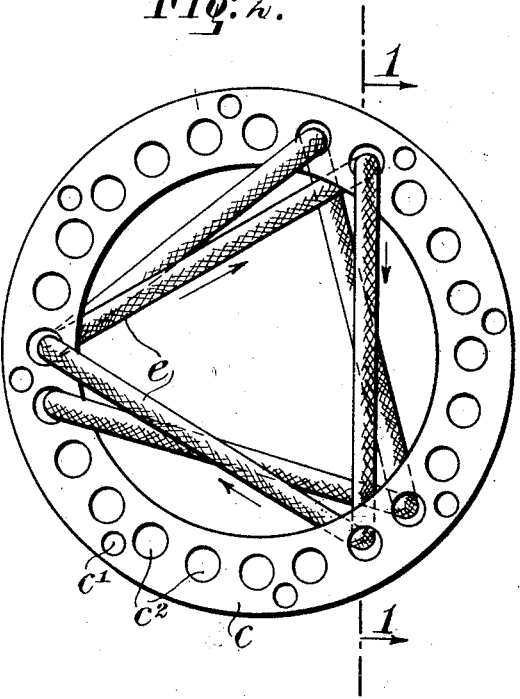
Figure 2 is a view in end elevation showing the relation of the cords as extending from one member of the coupling to another.

The two shafts to be coupled are indicated by the reference characters $a$ and $b$, it being understood that one of the shafts such as $a$ is the driving shaft and the other shaft such as $b$ is the driven shaft. These shafts may be centered by any known and suitable devices such as a ball and socket or other device which need not be illustrated herein. The problem is to connect these shafts in such manner as to permit universal movement therebetween and yet provide for the efficient transmission of the driving forces from one to another and in either direction of rotation, at all angular positions. In accordance with the present invention it is proposed to secure on the shafts what may be termed coupling members $a'$, $b'$, which will afford suitable anchorage for the improved devices for transmitting the driving forces. The invention is not to be limited to the form or design of such coupling devices. These coupling members are shown as having secured to their faces rings $c$, $d$, one of which $c$ is illustrated in Figure 2. Bolt holes $c'$ facilitate the securing of the ring as by bolts to the face of the coupling member $a'$. The coupling member $a'$ may be cup-shaped, and terminate in an annular seat $a^2$ against which the ring $c$ may be fastened. On a smaller radius is provided a series of holes $c^2$ in the ring for a purpose which will appear. The ring $d$ and the coupling member $b'$ to which it is secured are similarly formed. The power transmitting element in accordance with the invention consists of a cord $e$ which is somewhat elastic and which in the preferred embodiment will be wound endlessly through the holes $c^2$, $d^2$, in the opposed rings $c$, $d$, the interconnecting portions of the endless cord $e$ lying along chords of a circle struck about the axis of the shafts $a$, $b$, and with a radius equal to the distance from one of the holes $c^2$, $d^2$, to such axis, all as indicated most clearly in Figure 2. The number of holes $c^2$, $d^2$, spanned by each such portion of the cord $e$ will be determined by the conditions of use but the effect of the endless winding when completed is to provide a series of short lengths extending from one ring to the other and along which the driving forces are transmitted in a straight line regardless of the direction of rotation of the shafts $a$, $b$. The winding described provides for straight portions which cross each other adjacent their mid section and extend in opposite directions. A practical form of winding, as illustrated in Figure 2, is one in which the projection on a plane of a disc of three successive lengths of the cord $e$ forms an equilateral triangular, each leg spanning the same number of holes. It is to be understood, of course, the same results might be secured by not using an endless cord e so long as the straight lengths between the coupling members are provided for transmitting the driving forces along straight lines. In practice, however, it will be evident that the cord may be wound endlessly through the holes in the members c, d, with the utmost facility and the cord meanwhile be anchored under tension as is desirable to secure the best results. The invention is not to be limited to the means of anchoring the cord. In some cases, it is evident that the ring c, d, might have the cord e wound therein before the said rings are bolted to the respective couple members a', b', although the invention is not limited to the actual manner of assemblying.

Figure 3:
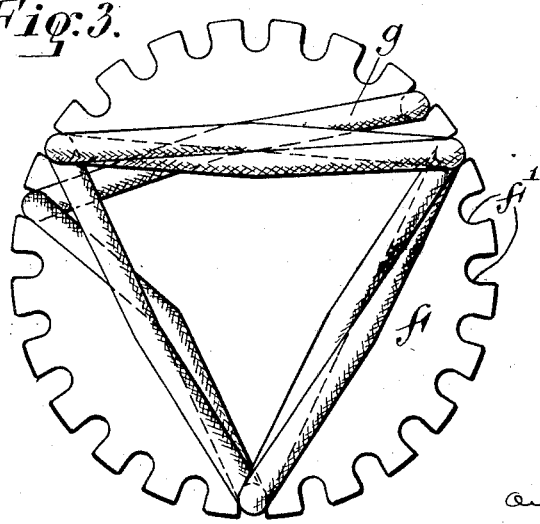
Figure 3 is a view in elevation and somewhat schematic indicating a different form of coupling member over which the cords may be wound readily.

An obvious modification is indicated in Figure 3 wherein each coupling member such as f may be provided with slots in its periphery f' through which the cord g may extend endlessly when wound between two such coupling members f in the general manner hereinbefore described or anchored separately in said slots when separate short lengths of such cord are employed. In any event the short lengths are confined under tension.

Other modifications may suggest themselves to one skilled in the art but are to be deemed within the spirit of the invention so long as driving forces are transmitted and universal movement afforded through devices of equivalent form.

What I claim is:

1. A universal joint including driving and driven members having annular series of openings respectively, and a flexible non-metallic elastic transmission element extending under tension alternately between openings in the respective series to lie along chords of the said annuli and forming closed triangles in projections whereby the forces transmitted thereby are in equilibrium.

2. In a universal joint including driving and driven members, a flexible elastic transmission element extending under tension alternately between said members and forming a closed triangle in projection and means for connecting said element to said members.

3. In a universal joint including driving and driven members, said members comprising discs having an annular series of openings therein and a flexible transmission element threaded under tension through certain of the openings and forming a closed triangle in projection, whereby the forces transmitted thereby are in equilibrium.

4. In a universal joint including driving and driven members, a flexible transmission element wound under tension between said members in a continuous lap fashion and means upon the members engaged by the winding during its formation.

5. In a universal joint including driving and driven members, said members comprising discs having an annular series of openings therein, a flexible transmission element threaded under tension through the openings in a continuous overlapping fashion.

6. In a universal joint including driving and driven members, said members comprising discs having an annular series of openings therein, a flexible transmission element threaded under tension through the openings in a continuous retrogressive lap fashion.

7. In a universal joint including driving and driven members, said members comprising discs having an annular series of openings therein, a flexible transmission element threaded under tension between the openings of the discs in such a manner that the projections upon the plane of either disc of three successive winding portions between openings, forms a closed triangle.

This specification signed this 13th day of March A. D. 1923.

AUGUST H. LEIPERT.